US012526591B2

(12) United States Patent
Sun et al.

(10) Patent No.: US 12,526,591 B2
(45) Date of Patent: Jan. 13, 2026

(54) PRINTED CIRCUIT BOARD ASSEMBLY FOR A HEARING DEVICE HAVING A MULTI-FEED ANTENNA APPARATUS AND HEARING DEVICE

(71) Applicant: Sivantos Pte. Ltd., Singapore (SG)

(72) Inventors: Wei Sun, Singapore (SG); Yew Seng Goh, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 315 days.

(21) Appl. No.: 18/323,555

(22) Filed: May 25, 2023

(65) Prior Publication Data

US 2023/0388726 A1 Nov. 30, 2023

(30) Foreign Application Priority Data

May 25, 2022 (DE) .................... 10 2022 205 231.5

(51) Int. Cl.

| | |
|---|---|
| ***H04R 25/00*** | (2006.01) |
| ***H01Q 1/27*** | (2006.01) |
| ***H01Q 21/00*** | (2006.01) |

(52) U.S. Cl.

CPC ........... *H04R 25/554* (2013.01); *H01Q 1/273* (2013.01); *H01Q 21/0006* (2013.01); *H04R 25/609* (2019.05); *H04R 2225/51* (2013.01)

(58) Field of Classification Search

CPC .... H04R 25/554; H04R 25/609; H01Q 1/273; H01Q 21/0006

See application file for complete search history.

(56) References Cited

U.S. PATENT DOCUMENTS

| | | | | |
|---|---|---|---|---|
| 7,646,356 | B2 | 1/2010 | Adel et al. | |
| 9,571,944 | B2 | 2/2017 | Fischer et al. | |
| 2015/0208180 | A1 | 7/2015 | Martius et al. | |
| 2019/0373381 | A1 | 12/2019 | Elghannai et al. | |
| 2020/0053490 | A1 | 2/2020 | Shriner et al. | |
| 2020/0186947 | A1 | 6/2020 | Prabhu et al. | |
| 2020/0314566 | A1 * | 10/2020 | Perri | H04R 25/554 |

FOREIGN PATENT DOCUMENTS

| | | | |
|---|---|---|---|
| DE | 102005008063 | A1 | 8/2006 |
| EP | 3726854 | A2 | 10/2020 |
| EP | 2932559 | B1 | 9/2021 |

* cited by examiner

*Primary Examiner* — Dieu Hein T Duong

(74) *Attorney, Agent, or Firm* — Laurence A. Greenberg; Werner H. Stemer; Ralph E. Locher

(57) ABSTRACT

A hearing device, in particular a hearing aid, includes a multi-feed antenna apparatus with at least two antenna branches. Each antenna branch is connected to a line. The lines are interconnected at a connection point and are routed through a filter and a first matching network to a transceiver circuit. A second matching network is assigned to each antenna branch for a phase shift and matching. A multi-feed antenna apparatus for the hearing device is also provided.

2 Claims, 3 Drawing Sheets

PRINTED CIRCUIT BOARD ASSEMBLY FOR A HEARING DEVICE HAVING A MULTI-FEED ANTENNA APPARATUS AND HEARING DEVICE

CROSS-REFERENCE TO RELATED APPLICATION

This application claims the priority, under 35 U.S.C. § 119, of German Patent Application DE 10 2022 205 231.5, filed May 25, 2022; the prior application is herewith incorporated by reference in its entirety.

FIELD AND BACKGROUND OF THE INVENTION

The invention relates to a hearing device, having a multi-feed antenna apparatus with at least two antenna branches. The invention further relates to a corresponding multi-feed antenna apparatus for a hearing device.

Hearing aids are portable hearing devices which serve, in particular, to provide care for persons with impaired or damaged hearing. In order to meet the numerous individual needs, different types of hearing aids such as behind-the-ear (BTE) hearing devices, hearing devices with an external receiver (RIC: receiver in the canal) and in-the-ear (ITE) hearing devices, e.g. also concha hearing devices or canal hearing devices (ITE, CIC: completely-in-channel, IIC: invisible-in-the-channel), are also provided. The hearing devices listed by way of example are worn on the outer ear or in the auditory canal of a hearing aid user. In addition, however, bone-conduction hearing aids, implantable or vibrotactile hearing aids are also available on the market. The damaged hearing is stimulated either mechanically or electrically.

In principle, the important (hearing device) components of hearing devices of that type are an input transducer, an amplifier and an output transducer. The input transducer is normally an acousto-electrical transducer, such as, for example, a microphone. The output transducer is mainly an electro-acoustic transducer, for example implemented as a miniature loudspeaker (receiver), or as an electromechanical transducer, such as, for example, a bone-conduction receiver. The amplifier is normally integrated into a signal processing device. Energy is normally supplied by a battery or a rechargeable accumulator.

Hearing devices of that type further have, for example, an electromagnetic receiver, for example an antenna apparatus as an RF antenna, through the use of which the hearing device is couplable through a signal connection to an operating element (remote control) and/or to a further hearing device. Due to space constraints, the same antenna apparatus is normally used for transmitting and receiving data.

Hearing devices are preferably configured to be particularly space-saving and compact, so that they can be worn by a hearing device user as visually inconspicuous as possible. As a result, smaller hearing devices which are increasingly comfortable to wear are increasingly being manufactured, and are therefore barely perceptible to a user when worn on or in an ear. However, due to the resulting reduced installation space, it is increasingly difficult to accommodate and/or install conventional antenna elements for wireless signal transmission in hearing devices of that type.

Styletto hearing devices, for example, have a particularly small and slim form factor which is also referred to as "SLIM-RIC" (slim receiver-in-canal hearing device). With hearing devices of that type, the available installation space above the battery, for example, is currently used to install the HF (HF: high-frequency) antenna lines. One possibility for further reducing the size of the form factor is to configure the (HF) antenna apparatus in such a way that some of the electronic components or ASICs (application-specific integrated circuits) are installed in the installation space in which the antenna apparatus is located.

Antenna apparatuses are conventionally implemented in BTE and (SLIM-)RIC hearing devices by using printed circuit boards (PCBs). The antenna apparatuses are configured in that case, for example, as an MBGA (mainboard ground antenna) or MBDA (mainboard PCB dedicated antenna). In the case of an MBGA antenna concept, a mainboard is used as part of the antenna. The mainboard or printed circuit board has an (antenna) excitation slot, wherein additional inductors are required in order to decouple all conductor paths which pass through the antenna excitation slot. In the case of an MBDA concept, the antenna lines or antenna arms are disposed on a dedicated printed circuit board area, wherein a certain grounding distance is required in the antenna area. Both MBGA and MBDA are antenna apparatuses which are conventionally configured with a single antenna feed (single-feed antenna apparatuses).

An antenna feed or an antenna feed system is understood in that case and below to mean, in particular, the cable or conductor and other associated devices which connect the transmitter or receiver or transceiver to the antenna and make the two devices compatible. The transceiver, for example, when transmitting signals, generates an AC current which is fed by the antenna feed into the antenna or the antenna arm which converts the power of the current into radio waves. The incoming radio waves correspondingly excite tiny alternating currents in the antenna, wherein the feed system forwards that current to the transceiver which processes the signal.

The antenna power of MBGA and MBDA antenna concepts depends largely on the printed circuit board configuration, such as, for example, the length of the printed circuit board, the origami (folding, bending) of the printed circuit board, or the location of the antenna excitation/feed. Both antenna concepts are furthermore comparably sensitive to the environment. Different mechanical materials (e.g. wires, battery, etc.), for example, which surround the mainboard influence the transmit or receive power of an antenna apparatus of that type.

SUMMARY OF THE INVENTION

It is accordingly an object of the invention to provide a particularly suitable hearing device having a multi-feed antenna apparatus and a particularly suitable multi-feed antenna apparatus. which overcome the hereinafore-mentioned disadvantages of the heretofore-known devices and apparatuses of this general type and which guarantee reliable signal transmission even with a form factor including a compact installation space.

With the foregoing and other objects in view there is provided, in accordance with the invention, a hearing device, in particular a hearing aid, having a multi-feed antenna apparatus with at least two antenna branches, wherein:

each antenna branch is connected to a line, the lines are interconnected at a connection point and are routed through a filter and a first matching network to a transceiver circuit, and a second matching network is assigned to each antenna branch for the phase shift and matching.

With the objects of the invention in view, there is also provided a multi-feed antenna apparatus for the hearing device according to the invention, having at least two antenna branches, wherein:

each antenna branch is connected to a line, the lines are interconnected at a connection point and are routed through a filter and a first matching network to a transceiver circuit, and a second matching network is assigned to each antenna branch for the phase shift and matching.

Advantageous embodiments and developments form the subject-matter of the dependent claims. The advantages and embodiments described with regard to the hearing device are transferable accordingly to the multi-feed antenna apparatus and vice versa.

A multi-feed antenna concept for a hearing device is implemented according to the invention. A multi-feed antenna apparatus is understood in this case and below to mean an antenna apparatus having a number of antenna branches (antenna arms) and a corresponding number of antenna feeds or feed points. In particular, the antenna apparatus has at least two antenna branches with at least two assigned antenna feeds.

The hearing device is preferably configured as a hearing aid and serves, in particular, to provide care for a user with impaired hearing (hearing device user). The hearing device is configured to receive sound signals from the environment and output them to the hearing device user. In order to do this, the hearing device has at least one input transducer, in particular an acoustic-electrical transducer, such as, for example, a microphone. During the operation of the hearing device, the input transducer receives sound signals (noises, tones, speech, etc.) from the environment and converts them in each case into an electrical input signal. The input signal is configured, for example, as a multi-channel signal. In other words, the acoustic signals are converted into a multi-channel input signal. The input signal therefore preferably has a plurality of frequency channels, in particular at least two, preferably at least 20, particularly preferably at least 40, for example 48 (frequency) channels, which in each case cover an assigned frequency band of a frequency range of the hearing device. A frequency range between 0 kHz and 24 kHz, for example, is divided into 48 channels so that input signals having 48 channels are generated.

The hearing device further has an output transducer, in particular an electro-acoustic transducer, such as, for example, a receiver. An electrical (multi-channel) output signal is generated from the electrical (multi-channel) input signal by modifying (e.g. amplifying, filtering, attenuating) the input signal or the individual frequency channels or signal channels in a signal processing device.

The hearing device is configured, for example, as a BTE hearing device or ITE hearing device or as an RIC hearing device, in particular as a SLIM-RIC hearing device.

According to the invention, the hearing device has a multi-feed antenna apparatus for wireless communication and/or signal processing with a further hearing device or an external operating and display device (for example a smartphone). The multi-feed antenna apparatus is preferably configured for a Bluetooth antenna frequency in the range between 2402 MHz (Megahertz) and 2480 MHz.

The multi-feed antenna apparatus according to the invention has an antenna or antenna element with at least two antenna branches. A line (conductor path), in particular a high-frequency (HF) or radiofrequency (RF) line, is connected to each antenna branch. The antenna and RF line of the hearing device are therefore divided into at least two parts. The lines are interconnected on a common connection point. In other words, the lines are combined at the connection point to form one line. This line is routed through a filter and a first matching network to a transceiver circuit.

The transceiver circuit also referred to below as the transceiver is configured in this case, for example, as an integrated circuit, in particular as an RFIC (radio frequency integrated circuit).

The first matching network is provided for matching/tuning between the filter and the transceiver or RFIC, and is suitable and configured for this purpose.

A second matching network is assigned in this case to each antenna branch for the phase shift. The second matching networks are therefore provided and configured to effect a phase shift of a signal passing through, i.e. to modify the phase of the signal when the signal passes through the respective second matching network. The second matching networks form the feed points or antenna feeds for the respective antenna branch.

The second matching networks are provided and configured in this case, in particular, to tune or adjust the phase shift and the S-parameters, in particular the S11 parameter, of the antenna branches. An S-parameter is understood in this case to mean, in particular, the input-output relationship between connections (or terminals) in an electrical system, wherein the S11 parameter indicates how much power is reflected by the antenna, and is therefore also known as the reflection coefficient. The S11 parameter is preferably adjusted by the second matching networks in such a way that it is as low as possible for a given (antenna) frequency. The phases of the two antenna branches are thus adjusted with the second matching networks and the power of the antenna apparatus is therefore optimized.

The second matching networks have, for example, inductors and capacitors for tuning or adjusting the S-parameters. For the phase shift, the second matching networks have, for example, a capacitor, an induction coil, a chipset, a diode, a balun and a micro strip as structural elements or components. The second matching networks preferably have, in particular, inductors and capacitors so that the matching and the phase shift take place simultaneously.

A particularly suitable hearing device with a particularly suitable multi-feed antenna apparatus is thereby implemented. The use of a multi-feed antenna concept enables a further size reduction or miniaturization of the hearing device or its form factor. No additional phase shifter is further required due to the use of the second antenna networks. Furthermore, in contrast to a conventional dipole antenna, no balun, for example, is required.

The antenna element or the antenna branches can be formed, for example, by a mainboard of the hearing device, an FPC (flexible printed circuit) antenna, a metal stamping antenna, a chip antenna, a ceramic antenna or the like.

In one advantageous development, the multi-feed antenna apparatus is disposed on a printed circuit board assembly. The printed circuit board assembly includes at least one printed circuit board (mainboard). A mainboard of the hearing device is preferably used in this case as the emitter or antenna for the wireless communication or signal connection. An effective use of the mainboard of the hearing device is thereby enabled without adversely affecting the power of the multi-feed antenna apparatus. No additional assembly work is therefore required to supply the multi-feed antenna apparatus, since the battery cell of the hearing device is already connected to the printed circuit board.

In one preferred embodiment, the printed circuit board assembly has two antenna sections and a circuit section, wherein the antenna sections form the antenna branches, and wherein the transceiver circuit, the filter and also the first matching network are disposed on the circuit section. The second matching networks are disposed, for example, on the circuit section or on the respective antenna sections.

The antenna sections are configured, for example, as an MBGA antenna concept. The entire mainboard of the hearing device is subdivided, for example, into three parts (two antenna sections and one circuit section).

In a conventional antenna configuration, the antenna is manufactured on a continuous metal element, wherein the corresponding installation space must be provided for the antenna element when it is installed in the hearing device. The antenna power is therefore reduced due to the limited installation space. In one antenna configuration with multiple feed, the antenna element is divided into two or three smaller antenna elements. It thus becomes flexible and can make effective use of the limited installation space in the hearing device. Compared with a conventional antenna concept, the multi-feed antenna apparatus therefore has improved RF antenna power.

In one conceivable embodiment, a feed point for the antenna branches is disposed in each case between the circuit section and the antenna sections.

In one suitable configuration, the antenna sections are disposed so as to be spatially separated from the circuit section. The antenna sections and the circuit section are therefore configured, in particular, as separate individual mainboards or printed circuit boards. The installation space in the hearing device can be used more effectively or more simply as a result.

Other features which are considered as characteristic for the invention are set forth in the appended claims.

Although the invention is illustrated and described herein as embodied in a hearing device having a multi-feed antenna apparatus and a multi-feed antenna apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
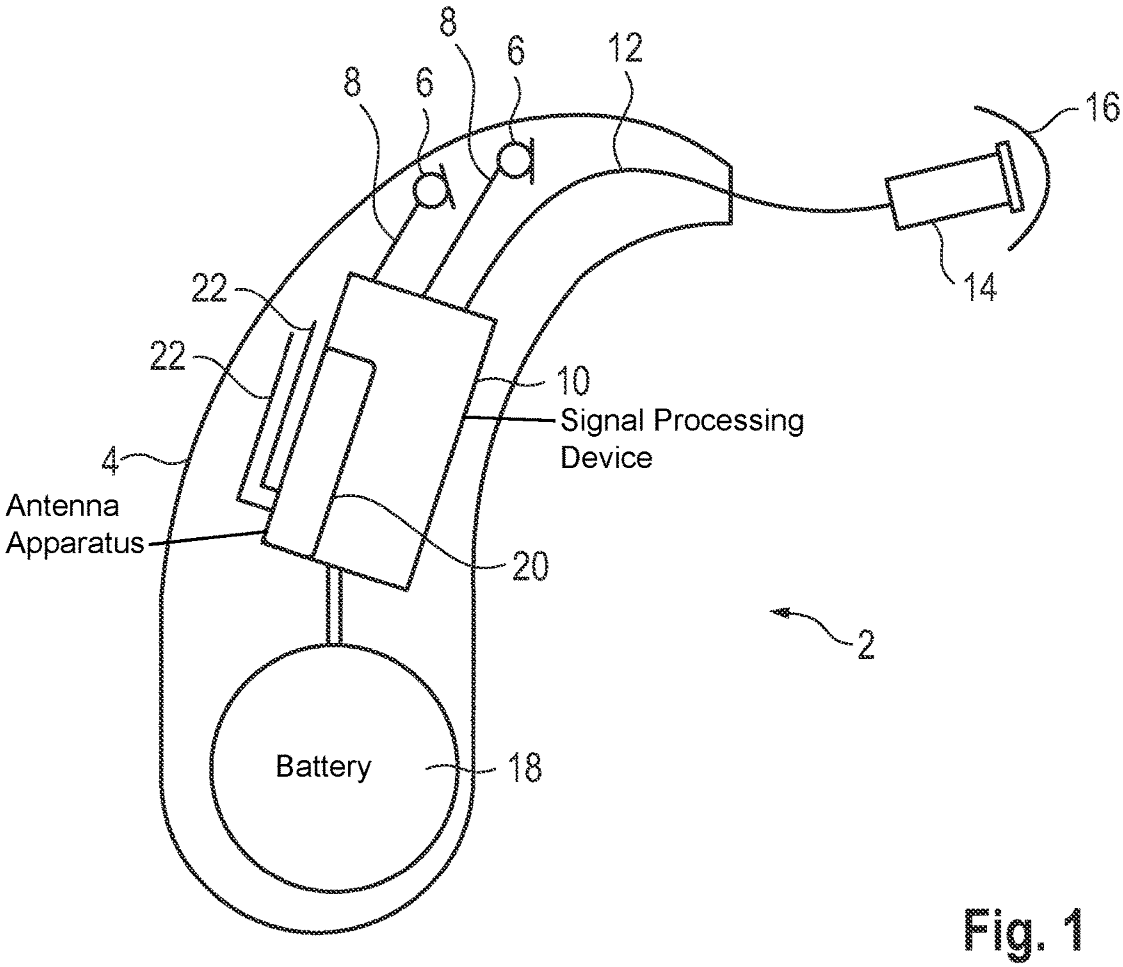
FIG. 1 is a diagrammatic, longitudinal-sectional view of a hearing device.

Referring now in detail to the figures of the drawings, in which matching parts and quantities are always denoted in each case with the same reference symbols, and first, particularly, to FIG. 1 thereof, there is seen a diagrammatic and simplified view of the basic structure of a portable hearing device 2. The hearing device 2 is configured in this case by way of example as a (SLIM) RIC hearing aid.

As shown diagrammatically in FIG. 1, the hearing device 2 includes a device housing 4 having a slim or compact form factor. One or more microphones, also referred to as (acousto-electrical) input transducers 6, are installed in the device housing 4. A sound or the acoustic signals in the environment of the hearing device 2 are picked up with the input transducers 6 and are converted into electrical, multichannel input signals 8. The input signals 8 preferably have a plurality of frequency channels, for example 48 channels in the frequency range between 0 kHz and 28 kHz.

A signal processing device 10, which is similarly integrated into the device housing 4, processes the input signals 8. An output signal 12 of the signal processing unit 10 is transmitted to an output transducer 14 outside the housing. The output transducer 14 is configured, for example, as a loudspeaker or receiver which outputs an acoustic signal. The output transducer 14 is disposed, for example, in a dome or otoplastic 16 which is insertable into the auditory canal of a hearing device user.

The energy supply of the hearing device 2 and, in particular, of the signal processing device 10 is provided by a battery (battery cell) 18 which is similarly integrated into the device housing 4. The device housing 4 has a charging interface 19 (FIG. 3) for charging the battery 18.

The hearing device 2 further has a multi-feed antenna apparatus 20 which is suitable and configured, for example, for wireless 2.4 GHz Bluetooth signal transmission in an ISM frequency band. A wireless signal connection, for example, with an operating and display device (not shown in detail), in particular with a smartphone, is implementable by the multi-feed antenna apparatus 20.

Figure 2:
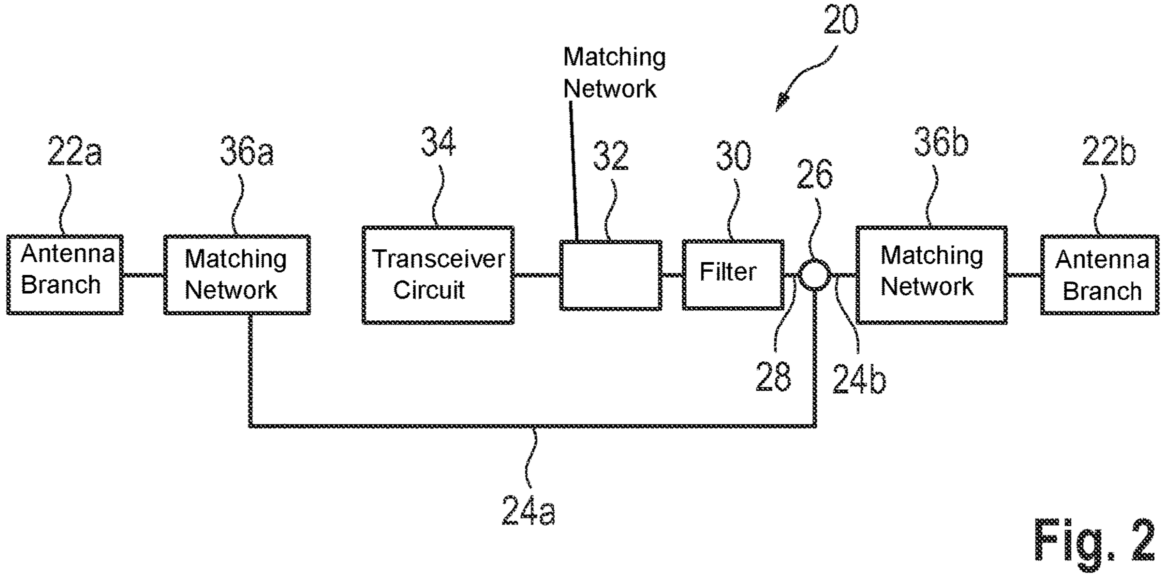
FIG. 2 is a block diagram of a multi-feed antenna apparatus.

The structure of the multi-feed antenna apparatus 20 is explained in detail below with reference to the schematic and simplified view shown in FIG. 2.

The multi-feed antenna apparatus 20 has an antenna or antenna element with at least two antenna branches **22*a*, 22*b*. Lines (conductor paths) 24*a*, 24*b*, which are interconnected at a common connection point 26 to form one line, are connected to each antenna branch 22*a*, 22*b*. A line 28 is routed through a filter 30 and a matching network 32 to a transceiver circuit 34. The transceiver circuit 34** is configured, for example, as an RFIC.

A matching network **36*a*, 36*b* is assigned to each antenna branch 22*a*, 22*b* for a phase shift. The matching networks 36*a*, 36*b* are connected between the connection point 26 and the respective antenna branch 22*a*, 22*b*. The matching networks 36*a*, 36*b* form feed points or antenna feeds in this case for the respective antenna branch 22*a*, 22*b***.

The phases of the two antenna branches **22*a*, 22*b* are adjusted and the power of the multi-feed antenna apparatus 20 is optimized with the matching networks 36*a*, 36*b*. The matching networks 36*a*, 36*b* are provided and configured, in particular, to tune or adjust the phase shift and the S-parameters, in particular the S11 parameter, of the antenna branches 22*a*, 22*b***.

A first exemplary embodiment of the multi-feed antenna apparatus 20 is explained in detail below with reference to FIG. 3 and FIG. 4.

Figure 3:
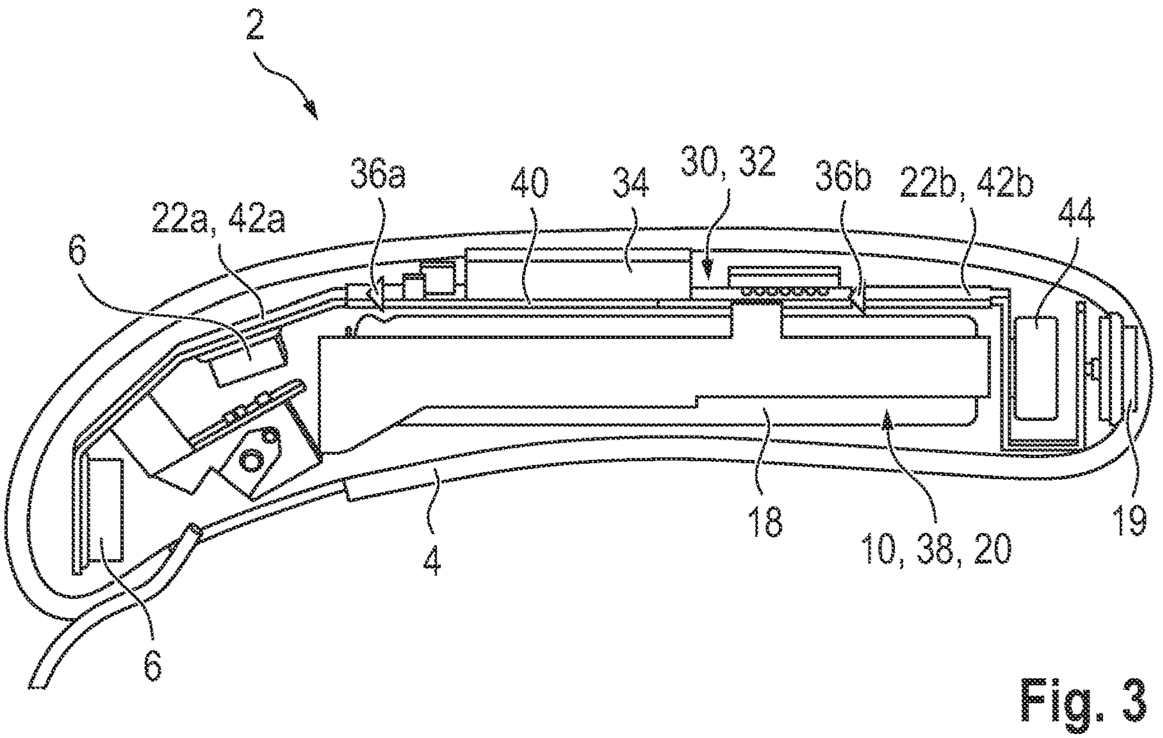
FIG. 3 is a perspective view of the hearing device.

FIG. 3 shows a perspective view of the hearing device 2 with a transparently illustrated device housing 4. The signal processing device 10 has a printed circuit board assembly in this case which encompasses the battery 18 in a compact installation space inside the device housing 4.

The signal processing device 10 has a mainboard as a printed circuit board assembly 38 on which the multi-feed antenna apparatus 20 is disposed. This printed circuit board assembly 38 has three spatially separated parts or sections 40, 42*a*, 42*b*. The part of the printed circuit board assembly 38 also referred to below as the circuit section 40 has the filter 30, the matching network 32 and also the transceiver circuit 34. The parts of the printed circuit board assembly 38 also referred to below as the antenna sections 42*a*, 42*b* in each case form one of the antenna branches 22*a*, 22*b* according to an MBGA antenna concept. The matching networks 36*a*, 36*b* are disposed in each case in the transition area between the circuit section 40 and the antenna sections 42*a*, 42*b*.

The hearing device 2 is configured, for example, as a binaural hearing device having two individual devices, wherein a second antenna apparatus 44 is disposed in each case in the device housings 4 for a signal connection between the individual devices, which is also referred to as ear-to-ear (e2e) communication. The antenna apparatus 44 is implemented, in particular, as a magnetic induction antenna (MI antenna).

Figure 4:
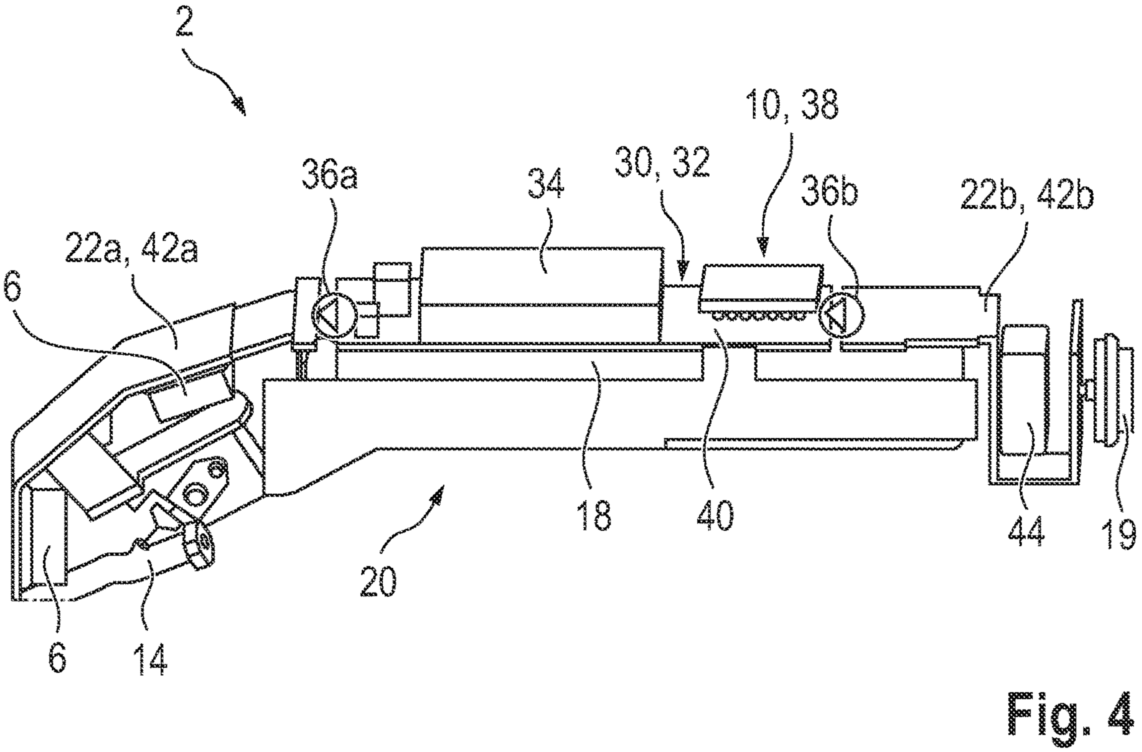
FIG. 4 is a perspective view of the multi-feed antenna apparatus in a first embodiment.

As shown in particular in FIG. 4, an antenna configuration making particularly efficient use of the installation space is implemented by the multi-part structure of the multi-feed antenna apparatus 20. The antenna section 42*a* is disposed in this case in the area of the input transducers 6 and the output transducer 14, wherein the antenna section 40 extends along the battery 18. The antenna section 42*b* encompasses the battery 18 and the antenna apparatus 44 in sections.

Figure 5:
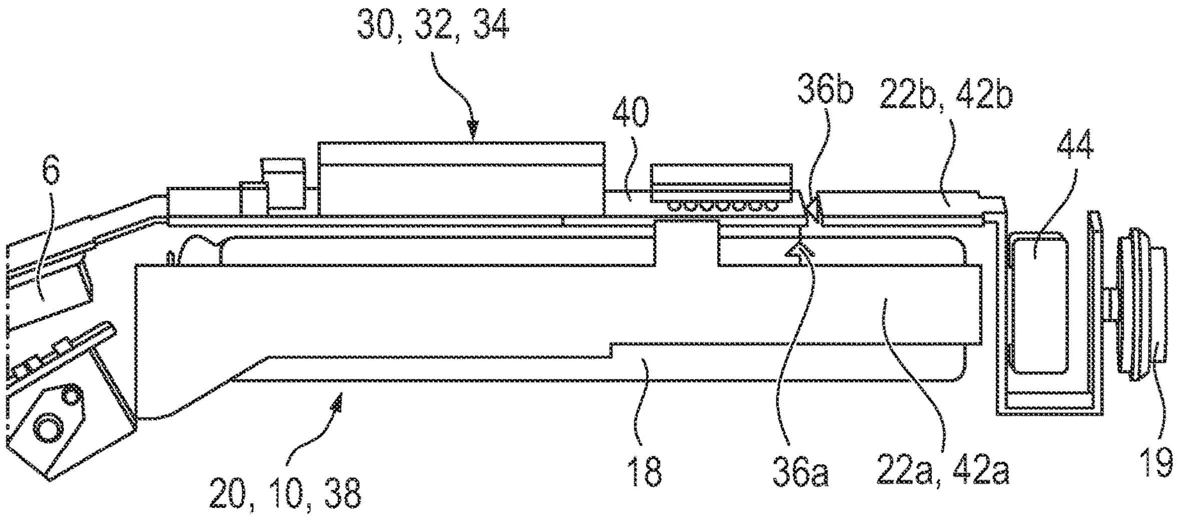
FIG. 5 is a perspective view of the multi-feed antenna apparatus in a second embodiment.
Figure 6:
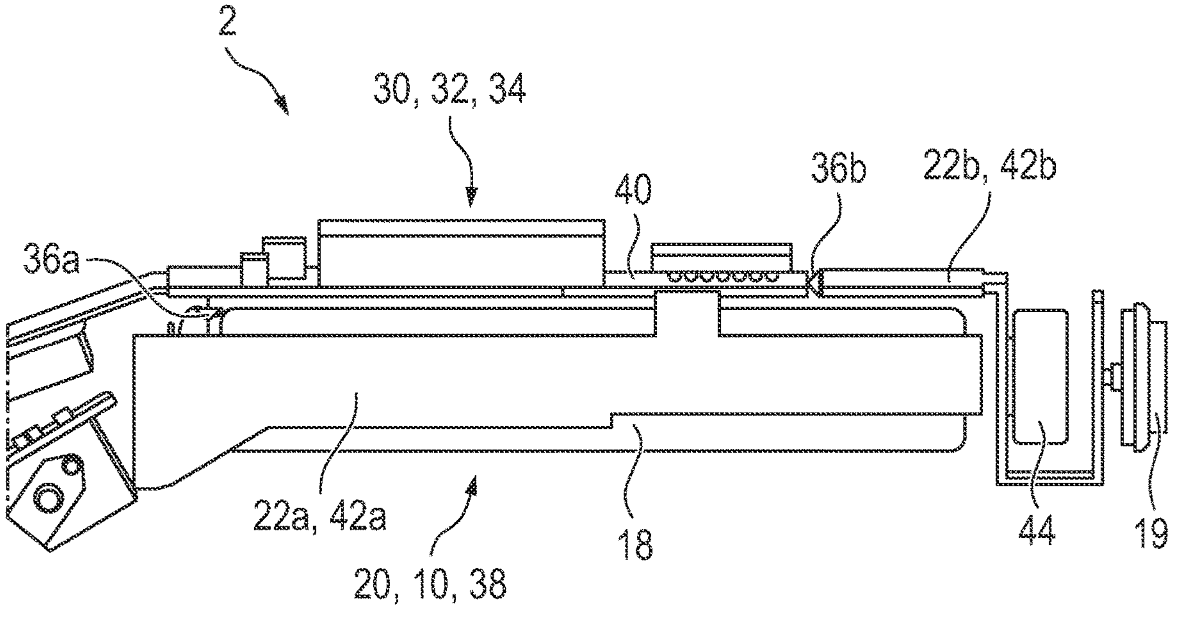
FIG. 6 is a perspective view of the multi-feed antenna apparatus in a third embodiment.

FIGS. 5 and 6 show a second and third embodiment of the multi-feed antenna apparatus 20. In these embodiments, the antenna branch 22*a* and the antenna section 42*a* are not configured as an MBGA, but as a further printed circuit board branch. The configurations shown in FIG. 5 and FIG. 6 differ in this case only in terms of the arrangement of the feed point or the arrangement of the matching network 36*a*.

The claimed invention is not limited to the exemplary embodiments described above. On the contrary, other variants of the invention can be derived therefrom by a person skilled in the art within the scope of the disclosed claims without departing the subject-matter of the claimed invention. In particular, all individual features described in connection with the different exemplary embodiments are further combinable in other ways within the scope of the disclosed claims without departing the subject-matter of the claimed invention.

The following is a summary list of reference numerals and the corresponding structure used in the above description of the invention.

REFERENCE SYMBOL LIST

2 Hearing device
4 Device housing
6 Input transducer
8 Input signals
10 Signal processing device
12 Output signal
14 Output transducer
16 Otoplastic
18 Battery
19 Charging interface
20 Multi-feed antenna apparatus
22*a*, 22*b* Antenna branch
24*a*, 24*b* Line
26 Connection point
28 Line
30 Filter
32 Matching network
34 Transceiver circuit
36*a*, 36*b* Matching network
38 Printed circuit board assembly
40 Circuit section
42*a*, 42*b* Printed circuit board section
44 Antenna apparatus

The invention claimed is:

1. A printed circuit board assembly for a hearing device, the printed circuit board assembly comprising:

at least one multi-feed antenna apparatus disposed on the printed circuit board assembly, said at least one multi-feed antenna apparatus having at least two antenna branches;

three spatially separated sections being a circuit section and two antenna sections;

a filter, a first matching network and a transceiver circuit;

lines each being connected to a respective one of said antenna branches, said lines being interconnected at a connection point and routed through said filter and said first matching network to said transceiver circuit;

second matching networks each being associated with a respective one of said antenna branches for phase shifting and matching;

said circuit section having said filter, said first matching network and said transceiver circuit;

said two antenna sections each forming a respective one of said antenna branches; and a transition region between said circuit section and said two antenna sections;

said second matching networks each being disposed in said transition region and forming a feed point for a respective one of said antenna branches.

2. A hearing device, comprising a signal processing device having the printed circuit board assembly according to claim 1.

* * * * *